United States Patent [19]

Heinze et al.

[11] Patent Number: 4,835,076

[45] Date of Patent: May 30, 1989

[54] ELECTRICALLY CONDUCTIVE POLYMER FILMS

[75] Inventors: Juergen Heinze; Klaus Hinkelmann, both of Freiburg, Fed. Rep. of Germany

[73] Assignee: BASF Aktiengesellschaft, Ludwigshafen, Fed. Rep. of Germany

[21] Appl. No.: 84,194

[22] Filed: Aug. 12, 1987

[30] Foreign Application Priority Data

Sep. 4, 1986 [DE] Fed. Rep. of Germany ....... 3630071

[51] Int. Cl.$^4$ ..................... H01M 4/60; C25C 11/00; H01B 1/06
[52] U.S. Cl. .................................. 429/213; 204/59 R; 252/500; 252/518; 252/512
[58] Field of Search ................. 204/59, 10; 252/500, 252/518, 512; 524/439, 414, 401, 412, 422, 230, 210, 226; 429/213

[56] References Cited

U.S. PATENT DOCUMENTS 4,468,291 8/1984 Waarmann et al. ............... 204/59
4,691,005 9/1987 Seto et al. .......................... 252/518

OTHER PUBLICATIONS

J.C.S. Chem. Comm., (1979).
J. Electroanal. Chem., 206(1986), 139–145.
Research Report RJ 3704, (1982).

*Primary Examiner*—Josephine Barr
*Attorney, Agent, or Firm*—Oblon, Fisher, Spivak, McClelland & Maier

[57] ABSTRACT

Electrically conductive polymer films based on an aromatic hydrocarbon or a 5-membered or 6-membered heterocycle having a conjugated $\pi$-electron system and nitrogen, oxygen or sulfur as hetero atoms and/or aniline are obtainable by electrochemical polymerization of the monomers in a polar aprotic solvent, the latter containing 0.05 to 1.0 mol/l of an amide of an aliphatic carboxylic acid of not more than 8 carbon atoms and/or of an aromatic carboxylic acid.

16 Claims, No Drawings

ELECTRICALLY CONDUCTIVE POLYMER FILMS

The present invention relates to electrically conductive polymer films based on aromatic hydrocarbons, 5-membered or 6-membered heterocycles having a conjugated $\pi$-electron system and nitrogen, oxygen or sulfur as hetero atoms and/or aniline, obtainable by electrochemical polymerization of the monomers in a polar aprotic solvent, wherein the solvent contains 0.05–1.0 mol/l of an amide of an aliphatic carboxylic acid of not more than 8 carbon atoms and/or of an amide of an aromatic carboxylic acid.

The present invention furthermore relates to a process for the preparation of such polymers and their use for the production of electrode materials, as switching elements and for antistatic treatment, and electrodes for secondary cells which contain such polymers as essential components.

The electrochemical polymerization of pyrrole in polar aprotic solvents was first described by Diaz and Kanazawa (J. Chem. Soc. Chem. Comm. 1979, page 635). The solvent used by these authors was acetonitrile containing 1% by weight of water, corresponding to a concentration of 0.5 M.

A. J. Donward and D. Pletcher (J. Electroanal. Chem. 206 (1986), 139) recently reported systematic investigations into the effect of water as an additive in the electrochemical polymerization of pyrrole in acetonitrile.

However, the water-containing polymer films obtainable by the two processes have unsatisfactory longterm stability, particularly when used as electrode materials in secondary cells, since the water undergoes a chemical reaction with the polypyrrole formed and thus gradually decomposes the latter.

The addition of certain bases to the solvents has also been discussed (J. Bargon, S. Mohmand and R. J. Waltman, IBM-Res. Rep. RJ 3704 (1982)); however, these bases have proven disadvantageous, particularly with regard to the rate of growth of the polymer films.

European Pat. No. 99,055 describes a process for the preparation of pyrrole polymer films the polymers formed by anodic oxidation in the presence of conductive salts being deposited in the form of a film on a sheet-like anode. According to column 3, suitable solvents are polar organic solvents which may contain up to 10% by weight of water. For the abovementioned reasons, these films too are not completely satisfactory owing to their water content.

It is an object of the present invention to provide electrically conductive polymer films which can be prepared in a simple manner and do not have the disadvantages described above.

We have found that this object is achieved, according to the invention, by the electrically conductive polymer films defined at the outset.

Preferred embodiments of the invention are given in the detailed description below an the subclaims.

The novel electrically conductive polymer films are derived from monomers of the group consisting of the aromatic hydrocarbons, the 5-membered and 6-membered heterocycles having a conjugated $\pi$-electron system and nitrogen, oxygen or sulfur as hetero atoms and/or aniline. Examples of these are benzen, naphthalene, anthracene, furan, thiophene and pyrrole and their derivatives. Suitable pyrroles are, for example, unsubstituted pyrrole itself as well as N-substituted pyrroles, such as N-alkylpyrroles. C-substituted pyrroles, such as derivatives which are substituted by $C_1$–$C_4$-alkyl or chlorine at C-3 and/or C-4 may also be used. Where mixtures of substituted pyrroles and unsubstituted pyrrole are used, the amount of unsubstsituted pyrrole is generally 50–99 mol %.

Particular examples of compounds of the class consisting of the thiophenes are unsubstituted thiophene and 2- and/or 3-alkylthiophenes, such as 2,3-diethylthiophene.

In addition to the abovementioned aromatic hydrocarbons benzene, napthalene and anthracene, other examples of hydrocarbons are polycyclic hydrocarbons, such as diphenyl and terphenyl. Benzene and diphenyl are preferred.

Any desired mixtures of the abovementioned monomers are also suitable. Pyrrole and its derivatives and thiophene and its alkyl derivatives, such as 2,3-dimethyl-or diethylthiophene, are preferred. It is important that the novel polymer films contain amides of aliphatic carboxylic acids of not more than 8 carbon atoms and/or amides or armoatic carboxylic acids, the said amides imparting better long-term stability to the films, particularly when they are used as electrode materials in electrochemical secondary cells. It is not yet completely clear whether these amides are present in chemically or physically bound form in the polymers.

These amides ar incorporated into the electrically conductive polymer films by adding 0.05–1, in particular 0.05–0.5, particularly preferably 0.05–0.4, mol/l of the appropriate amide to the solvent used in the electrochemical polymerization. The stated concentrations are to be understood as meaning that, after the addition of the amide, the resulting amide concentration in the solution in which the polymerization is carried out is in the abovementioned ranges.

Examples of such amides are formamide, acetamide, propionamide and benzamide, their $C_1$–$C_8$-alkyl-, alkoxy-or aryl derivatives which are mono- or disubstituted at the N atom, and chlorine derivatives. The monosubstituted derivates are generally preferred to the disubstituted ones. N-methyl derivatives of the abovementioned amides are particularly preferred. It has proven advantageous in many cases to use amides having a very high dielectric constant.

In the novel process for the preparation of electrically conductive polymer films based on aromatic hydrocarbons or 5-membered or 6-membered heterocycles having a conjugated $\pi$-electron system and nitrogen, oxygen or sulfur as hetero atoms and/or aniline by electrochemical polymerization of the monomers in an anhydrous aprotic polar solvent, 0.05–1 mol/l of an amide of an aliphatic carboxylic acid of not more than 8 carbon atoms and/or of an amide of an aromatic carboxylic acid is added to the solvent.

Preferably 0.05–0.5, in particular 0.05–0.4, mol/l of the amide is added. These concentration ranges result in a very high film formation rate, which may be several hundred times greater than that achieved under identical conditions without the addition of the amides, so that the novel process also results in improved productivity in comparison with the conventional processes.

The cycle life, which is important with regard to use in secondary cells, is substantially improved compared with water-containing films, without concessions having to be made in the level of charging. As in the case of the water-containing films, this level is generally 10–100, preferably 50–100, Ah/kg.

Another advantage of the novel process is that the amides used are less reactive during the anodic oxidation than the water usually employed. This makes it possible to use higher current densities and greater formation potentials.

Suitable monomers and amides have already been described above and therefore will not be discussed in detail here.

To prepare the polymer films, the monomers are anodically oxidized in an electrolyte solvent, preferably in the presence of a suitable conductive salt, and are polymerized during this process. The monomer concentration in this process is usually about 0.01–2, preferably about 0.05–1, in particular 0.1–0.5, mol/l of solvent. When the novel process is carried out by a continuous method, the concentration of the monomers and of the conductive salt in the electrolyte solution gradually decreases if the electrolysis lasts for a sufficiently long time; the electrolyte solution may therefore by replenished if required, ie. fresh monomers, amides and/or conductive salt can be metered in during the electrolysis. This is most advantageously done by circulating the electrolyte solution and metering the monomers, the amides and/or the conductive salt at the desired rate outside the actual electrolysis apparatus. However, it should be emphasized that, for the continuous process according to the invention and the preparation of pure uniform polymer films, the concentration of monomers and/or conductive salt in the electrolyte solution need not necessarily be kept constant, so that the novel process can be carried out in a simple closed electrolysis vessel without circulation of the electrolyte solution.

Suitable electrolyte solvents in the novel process are the polar aprotic organic solvents conventionally used for electrochemical polymerization and capable of dissolving the monomers and the conductive salt. Examples of preferred organic electrolyte solvents are ethers, such as 1,2-dimethoxyethane, dioxane, tetrahydrofuran or methyltetrahydrofuran, acetone, acetonitrile, dimethylformamide, dimethyl sulfoxide, methylene chloride, nitromethane, $So_2$, N-methylpyrrolidone and propylene carbonate, as well as mixtures of these solvents. The novel process is preferably carried out in the presence of a conductive salt.

Suitable conductive salts are the ionic or ionizable compounds conventionally used for electrochemical polymerization, in particular those containing anions of strong, oxidizing acids, or of aromatics which contain acidic groups and are unsubstituted or substituted by alkyl and/or nitro. Preferred conductive salts contain, as cations, the alkali metal cations, in particular $Li^+$, $Na^+$ or $K^+$, the $NO^+$ or $NO^+$ cation or onium cations, especially those of nitrogen and of phosphorus, for example of the type $R_4N^+$ and $R_4P^+$, where the radicals R independently of one another are each hydrogen, lower alkyl, preferably of 1 to 6 carbon atoms, cycloaliphatic radicals, preferably of 6 to 14 carbon atoms, or aromatic radicals, preferably of 6 to 14 carbon atoms. Examples of such onium cations are the tetramethylammonium, tetraethylammonium, tri-n-butylammonium, tetra-n-butylammonium, triphenylphosphonium and tri-n-butylphosphonium cation. $BF_4^-$, $AsF_4^-$, $AsF_6^-$, $SbF_6^-$, $SbCl_6^-$, $PF_6^-$, $ClO_4^-$, $HSO_4^-$ and $SO_4^{2-}$ have proven particularly advantageous as anions for the conductive salts. In another group of conductive salts, the anions are derived from aromatics having acidic groups. These include not only the $C_6H_5COO^-$ anion but in particular the anions of unsubstituted or alkyl-substituted aromatic sulfonic acids. Particularly preferred conductive salts are those which contain the benzene sulfonate or tosylate anion. In another very advantageous embodiment, the aromatics having acidic groups may furthermore be substituted by nitro. The conductive salts based on these acidic nitroaromatics include, for example, the salts of nitrophenols, of nitro-substituted aromatic carboxylic acids and of nitro-substituted aromatic sulfonic acids. In particular, the salts of nitro-, dinitro- and trinitrophenols, nitro-, dinitro- and trinitrobenzoic acids and nitro-, dinitro- and trinitrobenzenesulfonic acids may also be used.

In carrying out the novel process, the concentration of the conductive salt is in general from 0.001 to 1, preferably from 0.01 to 0.5, mole per liter.

The process according to the invention can be carried out in an electrolysis cell or electrolysis apparatus consisting of a cell with or without a diaphragm, and a cathode, an anode and an external direct current source. Appropriate apparatuses are known per se and are described in the literature. For continuous preparation process, the apparatuses described in EP-A No. 99 055 have proven particularly advantageous.

The reaction temperature at which the novel process is carried out has been found out to be critical, so that it may be varied in a wide range provided that it does not fall below the solidification temperature of the electrolyte solvent or exceed the boiling point of the said solvent.

In general, a reaction temperature of from $-40°$ to $+40°$ C. has proven very advantageous, the process usually being carried out at room temperature. Although not essential, it may be advantageous if the electrolysis is effected under an inert gas. The electrolyte solution can be stirred during electrolysis. It has proven advantageous to circulate the electrolyte solution, defined working temperatures being achieved by means of a thermostat.

In other respects, the conditions conventionally employed for the electrochemical polymerization of the stated monomers can be used in the novel process. For the current density, values of from 0.5 to 100, preferably from 1 to 50, mA/cm$^2$ have proven particularly advantageous. The resulting voltages are in general 1–50 V, in particular 2–20 V, depending on the composition of the cell used for the polymerization. These data apply in particular to pyrrole polymers.

The novel process can be used to prepare selfsupporting films of different thicknesses. In general, the films obtained are from 10 to 100 $\mu$m thick. The film thickness can be varied and set both via the residence time of the active anode material in the electrolyte solution and in particular via the current density. The pyrrole polymer films obtained can be washed with solvents to remove adhering conductive salt and can be dried at from 30° to 150° C., preferably under reduced pressure. The films can then be further processed to any desired form and can be used for a very wide variety of applications, for example for the production of electrodes, switches, shielding materials, etc. and for the antistatic treatment of plastics.

EXAMPLE

A 0.1 molar solution of pyrrole in anhydrous acetonitrile, which contained 0.2 mol/l of tetrabutylammonium hexafluorophosphate as the conductive salt and to which 0.15 mol/l of N-methylformamide had also been added, was introduced into an electrolysis apparatus divided by means of a diaphragm. The solution was electrolyzed potentiostatically at +1.4 volt against Ag-/AgCl or galvanostatically with a current density of 1.5 mA/cm². A smooth deep brown film formed at the Pt anode. After 20 minutes, the process was interrupted an the film removed from the electrode. The film was flexible and mechanically very stable. In cycling experiments, it was reversibly charged to 75 Ah/kg.

We claim:

1. A process for the preparation of an electrically conductive polymer film, comprising electrochemically polymerizing a monomer selected from the group consisting of aromatic hydrocarbon compounds, 5-membered or 6-membered heterocyclic compounds having a conjugated $\pi$-electron system and containing nitrogen, oxygen or sulfur as heteroatoms, or aniline or combinations thereof in a polar aprotic solvent containing an effective amount of one or more conductive salts and also containing from 0.05-1.0 mol/l of an amide of an aliphatic carboxylic acid containing not more than 8 carbon atoms; or an aromatic carboxylic acid amide selected from the group consisting of benzamide, chlorine substituted benzamide and $C_1$-$C_8$ alkyl, alkoxy or aryl N-substituted derivatives thereof or a combination thereof.

2. The process of claim 1, wherein the amount of said amide in the solvent ranges from 0.05 to 0.5 mol/l.

3. The process of claim 1, wherein said aromatic hydrocarbon monomer is benzene, naphthalene, anthracene, diphenyl or terphenyl.

4. The process of claim 1, wherein said heterocyclic compound monomer is furan, thiophene, pyrrole, N-substituted pyrrole or $C_{1-4}$ alkyl or chlorine substituted pyrrole at carbon atoms 3 or 4.

5. The process of claim 1, wherein said aliphatic carboxylic acid amide is formamide, acetamide or propionamide or the N-$C_{1-8}$ alkyl, alkoxy or aryl substituted derivatives thereof, or chloro substituted derivatives thereof.

6. The process of claim 1, wherein said electrochemical polymerization is conducted in an electrolyte solvent containing a conductive salt.

7. The process of claim 6, wherein the monomer concentration in said solvent ranges from about 0.01-2 mol/l of slovent.

8. The process of claim 7, wherein said monomer concentration ranges from 0.05-1 mol/l.

9. The process of claim 6, wherein said electrolyte solvent is an ether selected from the group consisting of 1,2-dimethoxyethane, dioxane, tetrahydrofuran and methyltetrahydrofuran, acetone, acetonitrile, dimethylformamide, dimethylsulfoxide, methylene chloride, nitromethane, $SO_2$, N-methylpyrrolidone or propylene carbonate.

10. The process of claim 6, wherein the concentration of the conductive salt in the electrolyte solution ranges from 0.001 to 1 mol/l.

11. The process of claim 6, wherein said conductive salt contains a cation selected from the group consisting of the alkali metal cations, $NO^+$, $NO_2^+$ and onium cations of the type $R_4N^+$ and $R_4P^+$, wherein the R groups independently are each hydrogen, lower alkyl, cycloaliphatic radicals or aromatic radicals, and wherein the anion of said conductive salt is a member selected from the group consisting of $BF_4^-$, $AsF_4^-$, $AsF_6^-$, $SbF_6^-$, $SbCl_6^-$, $PF_6^-$, $ClO_4^-$, $HSO_4^-$ and $SO_4^{-2}$.

12. The process of claim 1, wherein said electrochemical polymerization is conducted at a temperature ranging from $-40°$ to $+40°$ C.

13. The process of claim 1, wherein the current density of said electrochemical polymerization ranges from 0.5 to 100 mA/cm².

14. An electrically conductive polymer film prepared by the process of claim 1.

15. The polymer film of claim 14, wherein said film ranges in thickness from 10 to 100 $\mu$m.

16. An electrode in an electrochemical secondary cell, said electrode comprising the electrically conductive polymer film of claim 14 as its essential component.

* * * * *